United States Patent

Palmer

[19]

[11] Patent Number: 5,898,519
[45] Date of Patent: Apr. 27, 1999

[54] COMPACT NIGHT VISION DEVICE

[75] Inventor: Gary L. Palmer, Vinton, Va.

[73] Assignee: ITT Corporation, New York, N.Y.

[21] Appl. No.: 08/881,005

[22] Filed: Jun. 23, 1997

Related U.S. Application Data

[63] Continuation of application No. 08/405,172, Mar. 16, 1995, abandoned.

[51] Int. Cl.[6] .......................... G02B 23/00; G02B 23/02; G02B 23/22; G02B 27/02
[52] U.S. Cl. ........................ 359/399; 359/400; 359/409; 359/410; 359/419; 359/428; 359/424; 359/435; 250/213 VT; 250/214 VT
[58] Field of Search ...................................... 359/399, 400, 359/410, 409, 419, 428, 424, 411, 435; 250/213 VT, 214 VT

[56] References Cited

U.S. PATENT DOCUMENTS

| | | | |
|---|---|---|---|
| 1,476,717 | 12/1923 | Kandler et al. | 359/822 |
| 4,463,252 | 7/1984 | Brennan et al. | 250/213 VT |
| 4,563,061 | 1/1986 | Ellis | 359/409 |
| 4,629,295 | 12/1986 | Vogl | 359/400 |
| 5,408,359 | 4/1995 | Ferrett et al. | 250/214 VT |
| 5,414,557 | 5/1995 | Phillips | 250/214 VT |
| 5,495,364 | 2/1996 | Palmer | 359/412 |

*Primary Examiner*—Cassandra Spyrou
*Assistant Examiner*—Mohammad Y. Sikder
*Attorney, Agent, or Firm*—Plevy & Associates

[57] ABSTRACT

A lightweight night vision device that can be used by itself or can be selectively attached to either the objective lens assembly or ocular lens assembly of an existing optical device. The night vision device includes an image intensifier tube for amplifying low intensity light to produce a visible image. The image produced by the image intensifier tube is inverted. A prism assembly is positioned proximate to the image intensifier tube to reinvert the image in a space and cost efficient manner. The image intensifier tube, the power supply for the image intensifier tube and the reinverting prism are all contained within a house just large enough to accommodate these components. The housing has an objective port and an ocular port. Both ports are adapted to be joined to other optical components. As a result, a large variety of optical devices can be attached to either the object port or ocular port of the night vision device, thereby providing night vision capabilities to the optical device.

18 Claims, 3 Drawing Sheets

COMPACT NIGHT VISION DEVICE

This is a continuation of application Ser. No. 08/405,172, filed on Mar. 16, 1995, entitled COMPACT NIGHT VISION DEVICE, now abandoned.

FIELD OF THE INVENTION

The present invention relates to monocular night vision devices that enable a viewer to observe objects at night or during other low-light conditions. More particularly, the present invention relates to a lightweight, low cost monocular night vision system that can be used independently or can be adapted to be used as an objective lens supplement or an ocular lens supplement for secondary optical devices, thereby providing night vision capabilities to such devices.

BACKGROUND OF THE INVENTION

Night vision devices are widely used in the military to provide soldiers, aviators and sailors with the ability to view objects at night or during other low light conditions. As a result, many night vision devices are currently being manufactured according to exacting military specifications and designs. Similarly, many such night vision devices are being manufactured for specific military applications such as part of the sights of various weapons or as part of goggle assemblies that attach to an aviator's or soldier's helmet. As a consequence, many of the night vision devices currently being manufactured are neither affordable nor easily adapted to non-military uses by the general public.

As the military demands for night vision devices wane, manufacturers of night vision devices are starting to produce commercial products for sale to the general public. Night vision devices typically use sophisticated optics and electronics that make such devices very expensive. As a result, many commercially sold night vision devices are built into specialty optical devices that appeal to specific markets willing to pay the high cost. For example, night vision camera attachments are manufactured to attach 35 mm cameras. These devices are sold to photographers and journalists who want to take pictures at night. Night vision rifle scopes are sold to hunters who want to shoot nocturnal varmints or hunt during low light conditions. Night vision binoculars are sold to commercial fishermen and other boaters who want to navigate through various boating channels at night. A disadvantage of such specialty night vision devices is that they are typically designed for one specific application and can not be used in multiple applications. For instance, night vision boating binoculars can not be coupled to a camera to take pictures at night. Similarly, a night vision camera attachment can not typically be joined to a hunting scope because of incompatible optical designs.

A need therefore exists for a single low cost night vision device that can be used in multiple applications and can be used in conjunction with most every type of optical device. As a result, with a one time purchase of a night vision device, a person can join that device to a camera, video recorder, rifle scope, telescope or any other optical device, thereby converting that optical device into a night vision device.

ITT Corporation, the assignee herein, manufactures many night vision devices for various applications. An example of a night vision rifle scope is shown in U.S. Pat. No. 5,084,780 to Phillips entitled TELESCOPE SIGHT FOR DAY/NIGHT VIEWING. An example of a night vision camera attachment is the commercially sold Model F6010 Pocketscope. A binocular viewing device is exemplified by co-pending U.S. patent application Ser. No. 08/108,989 entitled NIGHT VISION BINOCULARS, now U.S. Pat. No. 5,495,364. Lastly, a monocular viewing device is exemplified by co-pending U.S. patent Ser. No. 08/152,193 entitled, MONOCULAR NIGHT VISION DEVICE, now abandoned.

Night vision devices typically utilize an image intensifier tube that amplify low level light to create a visible image. An objective lens assembly directs the low intensity light into the image intensifier tube. The visible image created by the image intensifier tube is viewed through an eyepiece assembly. In many night vision devices the image is collimated and/or inverted between the image intensifier tube and the eyepiece assembly. The optics comprising the objective lens assembly, eyepiece assembly, inverter and collimator add significantly to the cost of night vision devices. Furthermore, such optical elements consume a large amount of space, making the night vision device large and bulky. Such optical elements also are heavy making the overall night vision device too massive to join to other delicate optical devices.

It is therefore an object of the present invention to provide a small lightweight night vision device using a minimal amount of optical elements and consuming the minimal amount of space.

It is a further object of the present invention to present a low cost night vision device that can be adapted to most every type of optical device, either as an objective lens attachment or as an ocular lens attachment.

SUMMARY OF THE INVENTION

The present invention is a compact, lightweight night vision device that can be used by itself or can be selectively attached to either the objective lens assembly or ocular lens assembly of an existing optical device. The night vision device includes an image intensifier tube for amplifying low intensity light to produce a visible image. The image produced by the image intensifier tube is inverted. A prism assembly is positioned proximate to the image intensifier tube to reinvert the image in a space and cost efficient manner. The image intensifier tube, the power supply for the image intensifier tube and the reinverting prism are all contained within a housing that is just large enough to accommodate these components. The housing has an objective port and an ocular port. Both ports are adapted to be joined to other optical components. As a result, a large variety of secondary optical devices can be attached to either the object port or ocular port of the night vision device, thereby providing night vision capabilities to the secondary optical device.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE PREFERRED EMBODIMENT

Figure 1:
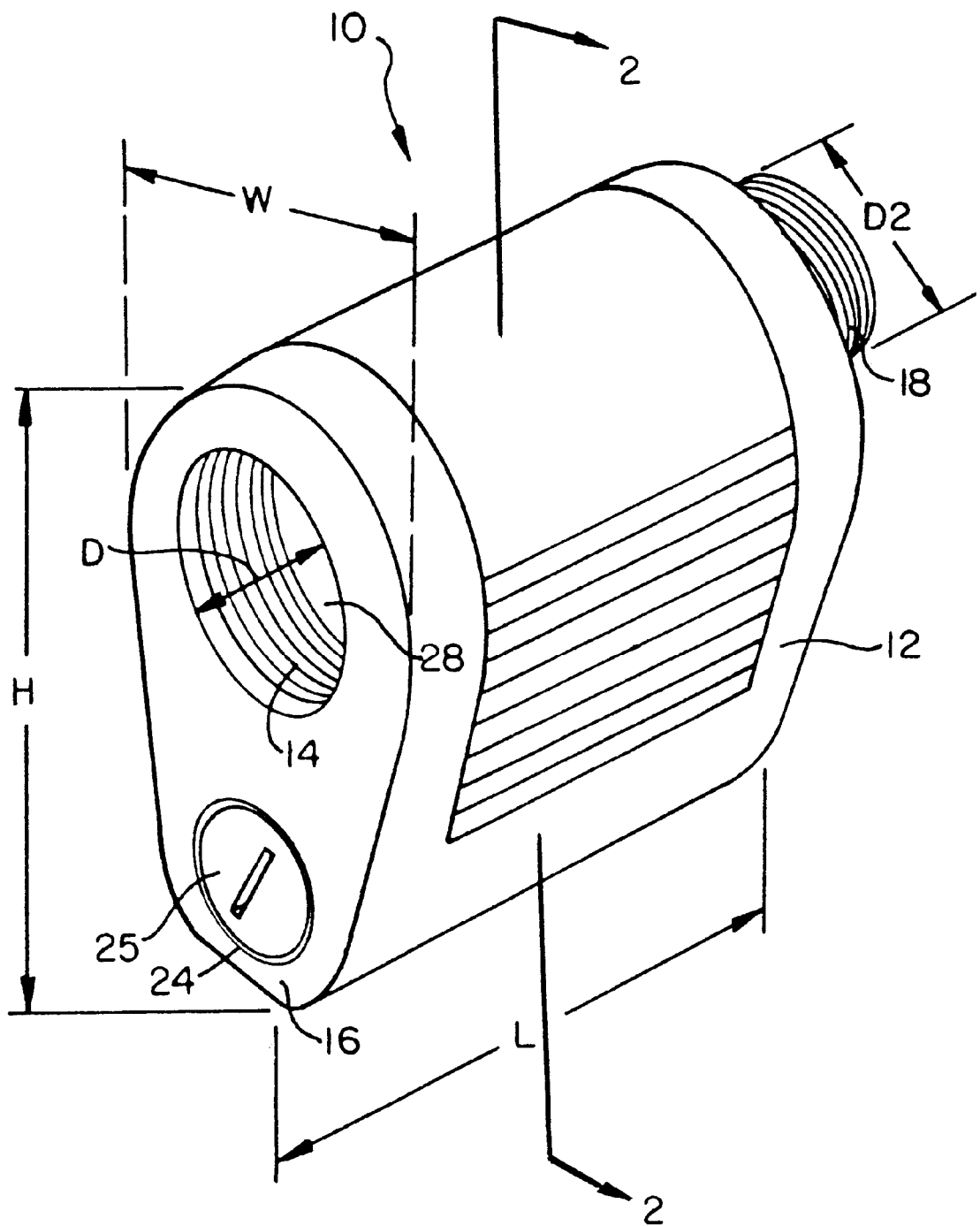
FIG. 1 is a perspective view of one preferred embodiment of the present invention night vision device.

Referring to FIG. 1, there is shown one preferred embodiment of the present invention night vision device 10. As will be explained, the night vision device 10 is designed to have a very small size and mass as compared to conventional night vision devices. In a preferred embodiment, the housing 12 of the night vision device 10 has a length L of less than 7 cm, a height H of less than 8 cm and maximum width W of approximately 5 cm. The night vision device 10 is not itself manufactured with an integral objective lens assembly or an eyepiece assembly. Rather, night vision device 10 is adapted to receive a large variety of objective lens assemblies and eyepiece assemblies depending upon the application for which the night vision device 10 is being used.

A threaded aperture 14 is disposed on a front surface 16 of the housing 12 of the vision device 10. The threaded aperture 14 has a predetermined diameter D and thread size. As will later be explained, any one of a variety of objective lens assemblies or other optical devices may be joined to the night vision device 10 via the threaded aperture 14. A threaded ocular extension 18 extends outwardly from a rear surface 20 (FIG. 2) of the housing 12. The threaded ocular extension 18 has a predetermined diameter D2 and thread size. The threaded ocular extension 18 enables a variety of ocular assemblies or other optical devices to be joined to the night vision device 10. A battery port 24 is disposed on front surface 16 of the night vision housing 12. The battery port 24 has a removable cover 25 and preferably retains two commercially available 1.5 volt batteries, or a single 3 volt battery.

Figure 2:
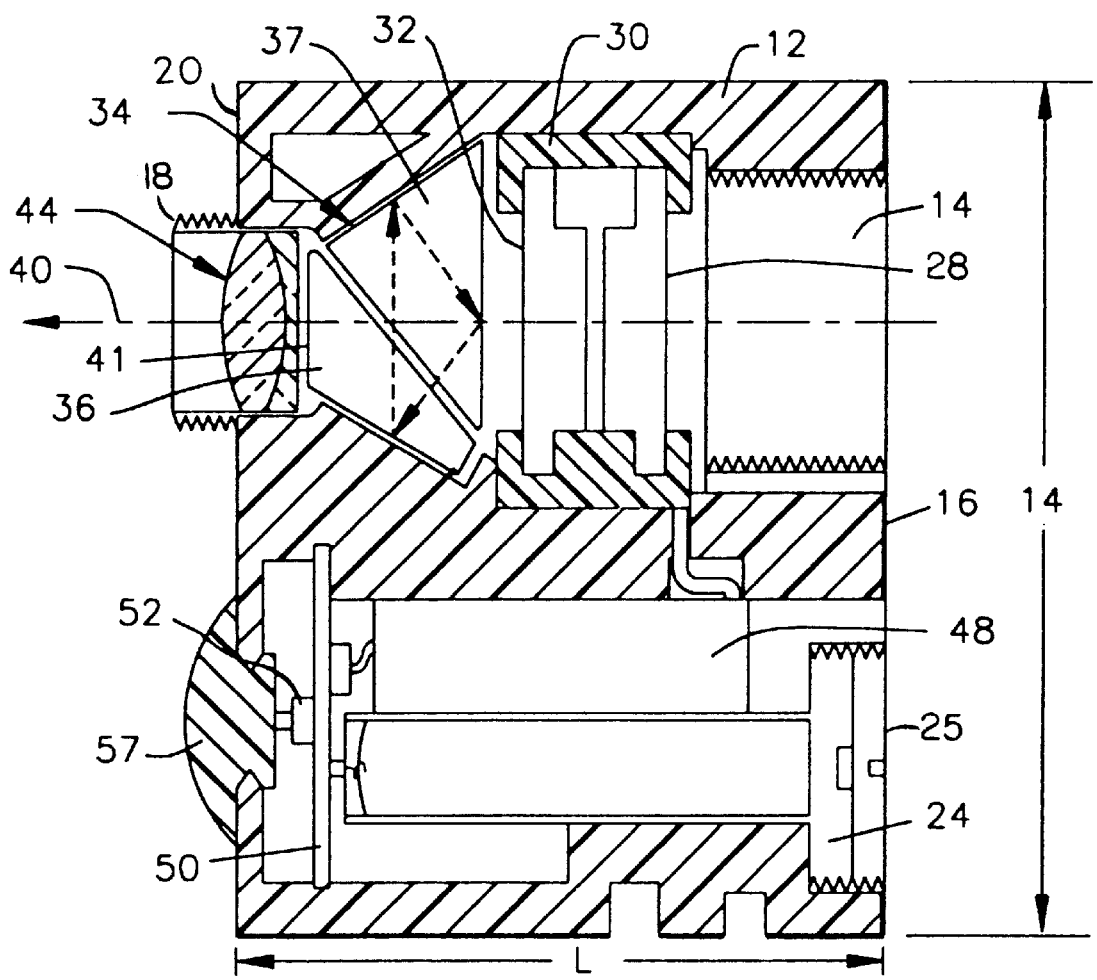
FIG. 2 is a cross-sectional view of the embodiment shown in FIG. 1, viewed along section line 2—2.

Referring to FIG. 2 in conjunction with FIG. 1, it can be seen that the threaded aperture 14 on the front surface 16 of the night vision housing 12 defines an opening that terminates at the photocathode 28 of an image intensifier tube 30. In the preferred embodiment, the image intensifier tube 30 is a Generation II tube that creates an inverted image at its output surface 32. A Generation III tube can be used in place of the Generation II tube. However, the inverting fiber optic bundle normally associated with a Generation III tube and sometimes the Generation II tube need not be used. This provides a significant cost savings to the manufacture of the night vision device 10, since the inverting fiber optic bundle of a Generation II and Generation III tube are expensive optical components. As low intensity light impinges upon the photocathode 28 of the image intensifier tube 30, the low intensity light is amplified and converted into an easily viewed image at the output surface 32 of the tube.

An inversion prism assembly 34 is disposed proximate the output surface 32 of the image intensifier tube 30. The purpose of the inversion prism assembly 34 is to invert the output image of the image intensifier tube 30 in a confined area. The inversion prism assembly 34 is used instead of a folded optic lens-based assembly to reduce the overall size of the night vision device 10. In the shown embodiment, a Pechan prism configuration is presented having a Schmidt prism 36 and a roof prism 37. However, many other inversion prism assemblies can be used. In the shown embodiment, the Schmidt prism 36 and the roof prism 37 combine to provide top/bottom and left/right inversion, thereby fully erecting the output image of the image intensifier tube 30.

In the shown embodiment, the image generated by the image intensifier tube 30 follows the indicated optical path 40 through the inversion prism assembly 34. The output surface 41 of the inversion prism assembly 34 lays in the same line as does the optical axis of the image intensifier tube 30. A doublet lens arrangement 44 is disposed proximate the output surface 41 of the inversion prism assembly 34. The doublet lens arrangement 44 receives the image from the output surface 41 of the inversion prism assembly 34 and provides some collimation to the image. As a result, any optical device coupled to the threaded ocular extension 18, would receive a generally collimated image.

The various electrical potentials needed to operate the image intensifier tube 30 are supplied by a power supply module 48. The power supply module 48 preferably is a self-contained potted element and is held in place by the space limitations of the housing 12. Electricity is provided to the power supply module 48 from batteries in the battery port 24, via a printed circuit board 50. An on/off switch 52 is disposed on the circuit board 50 facing the ocular end of the night vision device 10. An elastomeric button 57 extends through an aperture 55 in the housing and engages the on/off switch 57. The elastomeric button 57 enables a person to engage the on/off switch 52 and either enable or disable the night vision 10 device as desired, by disrupting the flow of electricity from the batteries to the power supply module 48.

As can be seen from FIG. 1 and FIG. 2, the present invention night vision device 10 contains a limited number of parts and has a very compact size. The optical components, power supply module 48 and battery port 24 are stacked in a vertical arrangement. To minimize size, the height H of the housing 12 is just larger than the combined heights of the optical components, power supply module 48 and battery port 24. The length L and the width W of the housing 12 are also selected to be just large enough to cover the night vision components in their stacked configuration. The battery port 24 extending from a region immediately adjacent said first end to said second end of said housing 12 and located laterally to said image intensifier tube 30 and prism assembly 34.

Figure 3:
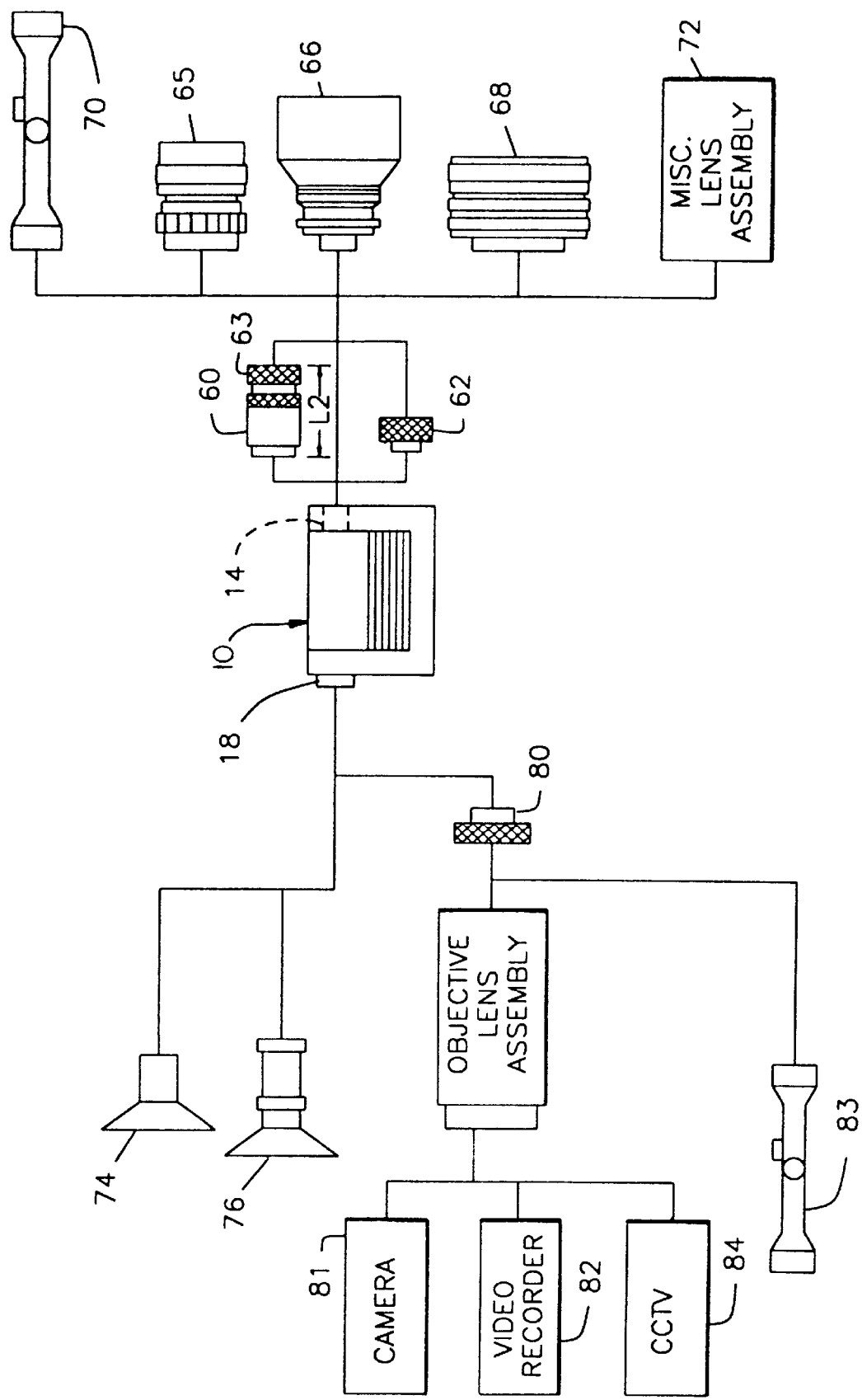
FIG. 3 is a side view of the present invention night vision device, shown in conjunction with multiple objective lens attachments and ocular lens attachment to facilitate further consideration and discussion, and to illustrate the intended uses of the present invention.

Referring to FIG. 3, the present invention night vision device 10 is shown as part of a modular system having multiple optional objective lens attachments and ocular lens attachments. As can be seen, the present invention night vision device 10 can be used as a self-contained viewing device or as either an ocular lens or objective lens attachment for an existing optical device.

When attaching a secondary lens system to the objective of the night vision device 10 a connector may be required, if the thread size of the threaded aperture 14 is not compatible with secondary lens system. Three options that are available in connectors include the use of a focusable connector 60, a static connector 62 or no connector at all. When no connector is used, the secondary lens system would directly engage the threaded aperture 14 on the first surface 16 of the night vision housing 12. If a focusable connector 60 or static connector 62 are used, these connectors would threadably engage the night vision housing 12 and would provide a connector surface adapted to receive a specific type of secondary lens system. The focusable connector 60 is a connector that can be varied in its length L2 by rotation of a focus wheel 63 on its exterior surface. Such devices are common place in focusable optical systems. As such, the focusable connector can be used to vary the distance between a secondary lens system attached to the focusable connector 60 and the input surface of the image intensifier tube within the night vision device. This ability to adjust the distance, enables the two devices to be focused in a manner that would produce a clear image.

There are many different secondary lens systems that can be attached to the objective of the night vision device 10. Those secondary lens systems include a standard zero power objective lens assembly 65 that is custom made for the night vision device 10 and may be sold with the night vision device 10. The zero power objective lens assembly 65 enables the night vision device 10 to be used as a simple night vision spotting scope. Other secondary lens systems that can be used include, but are not limited to, galilean telescopic lenses 66, camera lens 68, guns scopes 70, or other miscellaneous optical devices 72 such as periscopes, telescopes and the like.

A large variety of ocular lens assemblies are also available for the present invention night vision device 10. These ocular lens assemblies would engage the threaded ocular extension 18 extending from the night vision housing 12. Those ocular lens assemblies include a simple zero power eyepiece assembly 74 that is custom made for the night vision device 10 and is preferably sold as part of the night vision device 10. In an alternate embodiment a telescopic eyepiece 76 can be provided that would magnify the output image created by the image intensifier within the night vision device 10. The zero power eyepiece assembly 74 or telescopic eyepiece 76 threadably engage the threaded ocular extension 18 in a manner that optically aligns the eyepiece with the image created by the night vision device 10.

An adaptor 80 may also be joined to the threaded ocular extension 18, if the thread size of the ocular extension is not compatible with the secondary optical device. Similarly, the adaptor may be joined to either the zero power eyepiece assembly 74 of the telescope eyepiece 76. The adaptor 80 can be a 35 mm "T" adaptor that enables the night vision device to be coupled to a 35 mm camera 81. The adaptor 80 could also join the night vision device to the objective lens of a video recorder 82, gun scope 83, or television camera 84.

From the above description, it should be understood that the present invention night vision device is a modular component that can be coupled to either the objective lens assembly or the ocular lens assembly of most any existing optical device, thereby providing that ocular device with night vision capabilities. The night vision device contains little more than an image intensifier tube and a prism system used to invert the image produced by the image intensifier tube. The housing that contains the night vision device is sized and shaped to be as small as is necessary to envelop the various components of the night vision device, thereby minimizing the size of the present invention.

The present invention night vision device shown in the figures is merely exemplary. Numerous modifications in components, optical orientations and materials could be made by a person skilled in the art. For example, in the illustrated embodiment, the ocular output of the night vision device is linearly aligned with the image input of the image intensifier tube. It will be understood that by alternating the prism assembly used to invert the image, a device with an off-set ocular output can be obtained. All such variations and modifications are intended to be included in the scope of this invention, as defined by the following claims.

What is claimed is:

1. A night vision device comprising:
   a housing having a first end and an opposing second end, said first end defining an optical input orifice and said second end defining an optical output orifice, said optical input orifice coaxially aligned with said optical output orifice;
   an image intensifier tube for creating an inverted output image, said image intensifier tube coaxially aligned with and disposed between said optical input orifice and said optical output orifice of said housing;
   a prism assembly for reinverting the inverted output image of said image intensifier tube, said prism assembly disposed between said image intensifier tube and said optical output orifice of said housing;
   a battery port for retaining at least one battery, said battery port extending from a region immediately adjacent said first end to said second end of said housing and located laterally to said image intensifier tube and said prism assembly; and
   a power supply module disposed within said housing for supplying power to said image intensifier tube, said power supply module located between said image intensifier tube and said battery port.

2. The night vision device according to claim 1, further comprising power switching means for selectively transmitting electricity provided by a battery contained within said battery port to said power supply module, said power switching means extending from said first end of said housing to said battery port and located laterally to said image intensifier tube.

3. The night vision device according to claim 2, further comprising a collimator assembly disposed in said housing proximate said output orifice.

4. The night vision device according to claim 1, wherein said input orifice includes attachment means for removably coupling a secondary optical system to said night vision device.

5. The night vision device according to claim 4, further comprising a secondary optical system removably coupled to said input orifice of said night vision device via said attachment means, said secondary optical system having an optical path which is aligned with said image intensifier tube.

6. The night vision device according to claim 5, wherein said secondary optical system comprises a removable objective lens assembly.

7. The night vision device according to claim 4, wherein said attachment means includes an internal thread for engaging a corresponding external thread of the secondary optical system.

8. The night vision device according to claim 7, wherein said attachment means further includes an adaptor having an external thread corresponding to said internal thread and removably coupling said adaptor to said input orifice of said night vision device, said adaptor further having thread means for removably coupling the secondary optical system to said adaptor.

9. The night vision device according to claim 1, wherein said output orifice includes attachment means for removably coupling a secondary optical system to said night vision device.

10. The night vision device according to claim 9, further comprising a secondary optical system removably coupled to said output orifice of said night vision device via said attachment means, said secondary optical system having an optical path which is aligned with said prism assembly.

11. The night vision device according to claim 10, wherein said secondary optical system comprises a removable eyepiece assembly.

12. The night vision device according to claim 9, wherein said attachment means includes an external thread for engaging a corresponding internal thread of the secondary optical system.

13. The night vision device according to claim 12, wherein said attachment means further includes an adaptor having an internal thread corresponding to said external thread and removably coupling said adaptor to said output orifice of said night vision device, said adaptor further having thread means for removably coupling the secondary optical system to said adaptor.

14. The night vision device according to claim 1, wherein said image intensifier tube is selected from a group consisting of a Generation II image intensifier tube and a Generation III image intensifier tube.

15. The night vision device according to claim 1, wherein said housing has a length, a height, and a width, said length being less than 7 cm, said height being less than 8 cm, and said width being less than 6 cm.

16. A device for providing night vision capabilities to an existing optical assembly, comprising:

a housing having a first end and an opposing second end, said first end defining an optical input orifice and said second end defining an optical output orifice, said optical input orifice coaxially aligned with said optical output orifice;

an image intensifier tube for creating an inverted output image, said image intensifier tube coaxially aligned with and disposed between said optical input orifice and said optical output orifice of said housing;

a prism assembly for reinverting the inverted output image of said image intensifier tube, said prism assembly disposed between said image intensifier tube and said optical output orifice of said housing;

a battery port for retaining at least one battery, said battery port extending from a region immediately adjacent said first end to said second end of said housing and located laterally to said image intensifier tube and said prism assembly; and a power supply module disposed within said housing for supplying power to said image intensifier tube, said power supply module located between said image intensifier tube and said battery port;

wherein one of said input orifice and said output orifice includes attachment means for removably coupling an existing optical system to said device.

17. The night vision device according to claim 16, further comprising power switching means for selectively transmitting electricity provided by a battery contained within said battery port to said power supply module, said power switching means extending from said first end of said housing to said battery port and located laterally to said image intensifier tube.

18. The night vision device according to claim 16, wherein each of said input and output orifices includes attachment means for removably coupling an existing optical system to said device.

* * * * *